Feb. 19, 1952   G. I. DANLY   2,586,617
SEALING CONSTRUCTION FOR FLUID PRESSURE OPERATED BRAKE
AND CLUTCH ASSEMBLIES
Filed March 25, 1948   2 SHEETS—SHEET 1
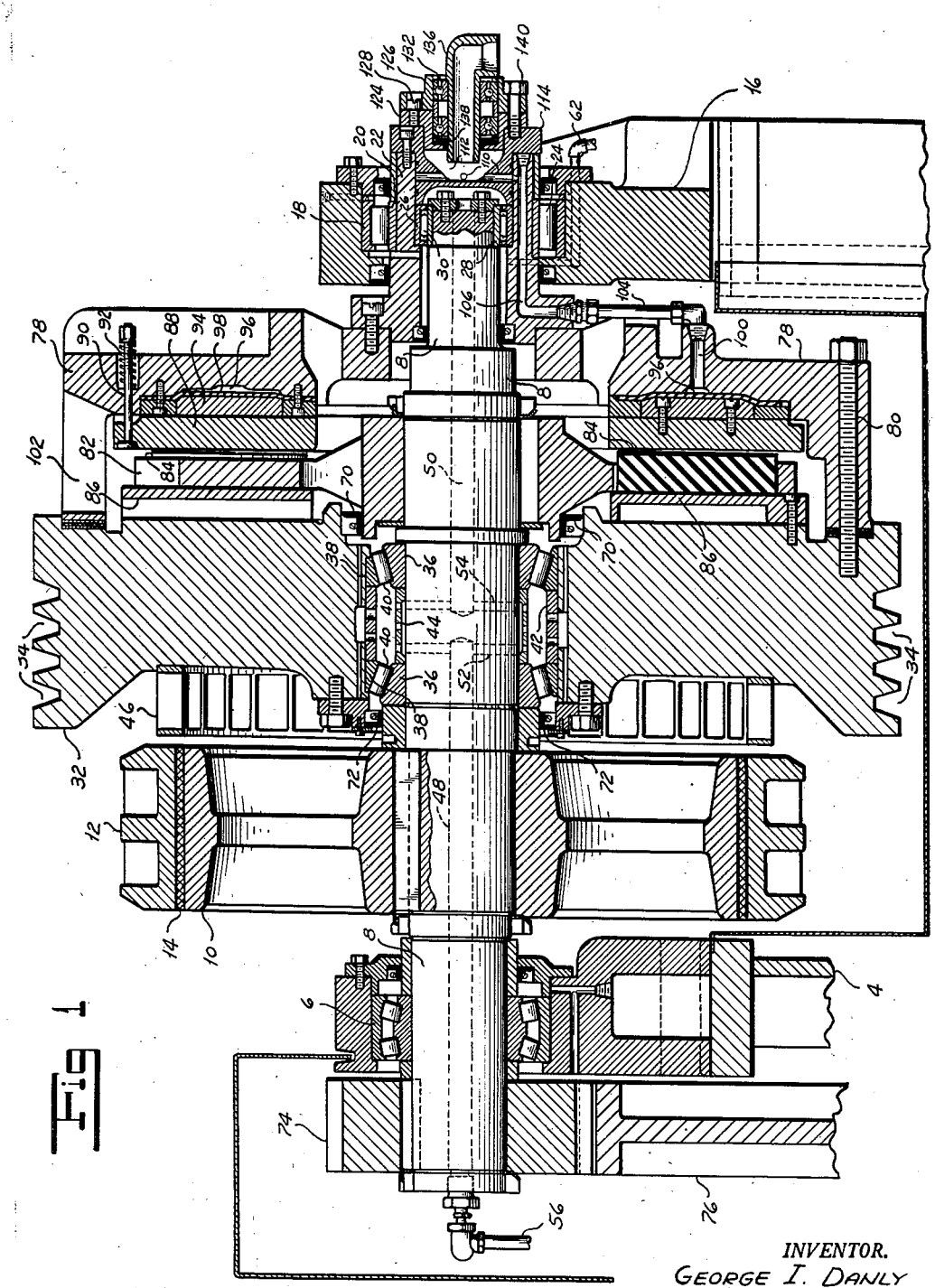
INVENTOR.
GEORGE I. DANLY
BY Henry L. Shenier
ATTORNEY Feb. 19, 1952  G. I. DANLY  2,586,617
SEALING CONSTRUCTION FOR FLUID PRESSURE OPERATED BRAKE
AND CLUTCH ASSEMBLIES
Filed March 25, 1948  2 SHEETS—SHEET 2
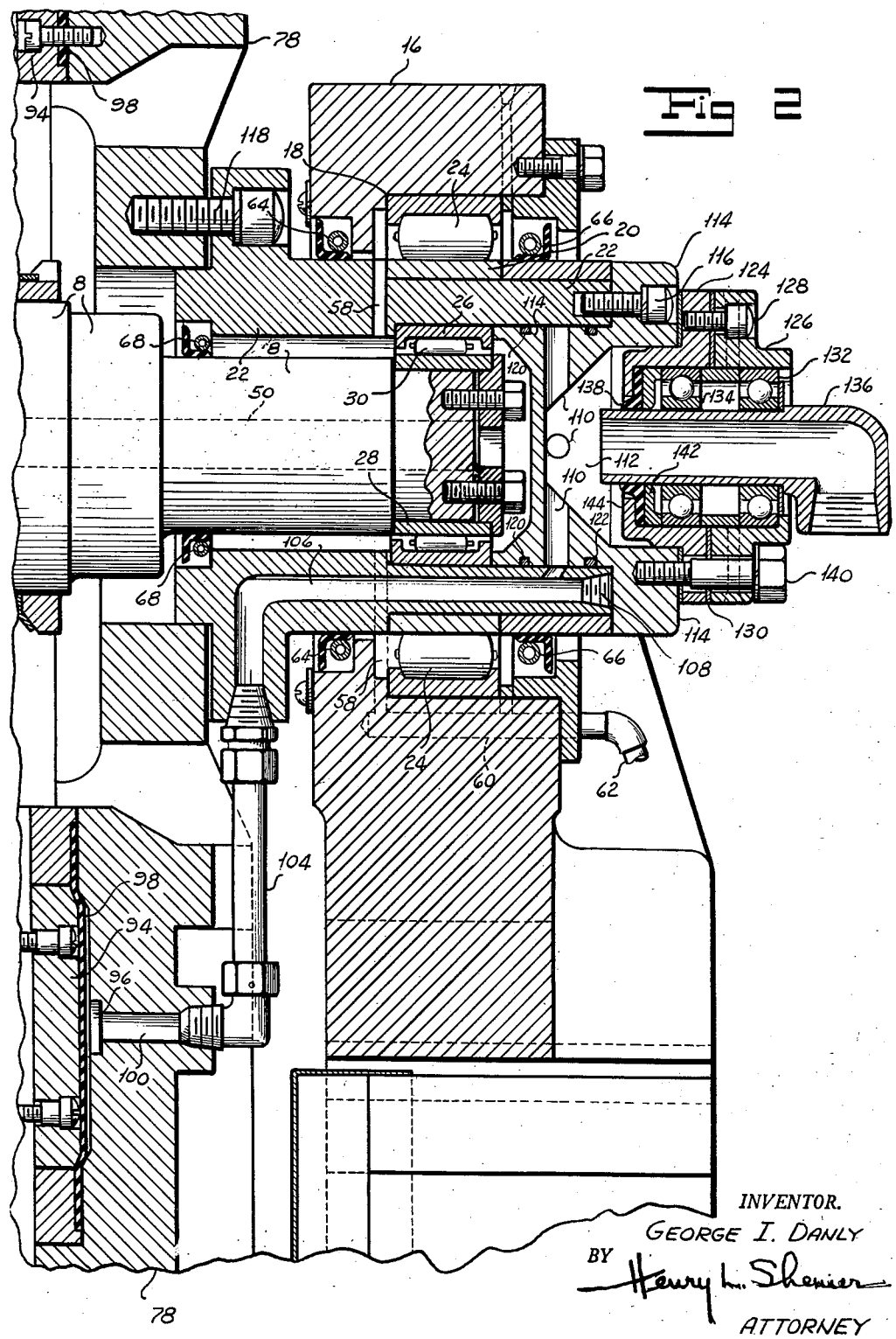
INVENTOR.
GEORGE I. DANLY
BY Henry L. Shenier
ATTORNEY Patented Feb. 19, 1952

2,586,617

UNITED STATES PATENT OFFICE 2,586,617

SEALING CONSTRUCTION FOR FLUID PRESSURE OPERATED BRAKE AND CLUTCH ASSEMBLIES

George I. Danly, Elmhurst, Ill., assignor to Danly Machine Specialties, Inc., Chicago, Ill., a corporation of Illinois Application March 25, 1948, Serial No. 16,968

2 Claims. (Cl. 192—88)

My invention relates to a sealing construction for fluid pressure operated brake and clutch assemblies and more particularly to an improved sealing construction for the fluid pressure operated brake and clutch assembly for power presses.

In a power press, the energy is largely supplied from the kinetic energy stored in the flywheel which is driven by a prime mover, such as an electric motor. The motor serves merely to return the flywheel to speed during the large part of the cycle in which no work is done. It is common practice in the power press art to employ a continuously running motor driving a continuously running flywheel which is adapted to be clutched to and unclutched from the gear train driving an eccentric or crank. The arrangement is such that the ram and associated driving mechanism when unclutched from the flywheel are brought to rest and are mobilized by a brake. At the start of the working stroke the brake is substantially simultaneously released and the clutch engaged. A convenient and customarily employed means for setting the clutch and releasing the brake employs fluid pressure, usually compressed air, at pressures between 60 and 100 pounds per square inch. Due to the difficulty of sealing the joints between stationary and moving parts, most of the prior art uses overhanging flywheels, that is a flywheel supported by a shaft projecting beyond a support in the form of a cantilever. Inasmuch as the flywheels are heavy masses of metal, considerable danger exists in supporting the flywheel in this manner. Frequently, due to crystallization of the metal in the shaft supporting the flywheel, the shaft breaks and the flywheel has been catapulted from the press, injuring not only men but causing considerable material damage. In an effort to provide an increased factor of safety presses have been built in which the flywheel has been mounted intermediate supporting bearings in which the shaft carrying the flywheel is supported by bearings on both sides of the flywheel. In this construction, the inner seal is substantially inaccessible. Power presses are frequently employed as part of a production line. When the inner seal of the air system for operating the clutch and brake fails, it is a major task to replace it. The task is not only time consuming and expensive, but results in blocking the production line for an excessive period of time which represents a large economic loss.

One object of my invention is to provide an improved sealing construction for fluid pressure operated brake and clutch assemblies of power presses in which a flywheel supported intermediate of bearings is employed.

Another object of my invention is to provide a fluid pressure operated brake and clutch assembly for power presses having a flywheel and intermediate bearings in which a single air seal is employed.

A further object of my invention is to provide a sealing construction for fluid pressure operated brake and clutch assemblies for power presses in which the air seal is readily accessible.

Other and further objects of my invention will appear from the following description.

In general, my invention contemplates the provision of a sleeve secured to and carried by the flywheel for rotation therewith. The sleeve is provided with an air duct communicating with a manifold situated outboard of the pillar block supporting the outer bearing of the shaft on which the flywheel is mounted. In this manner, the air seals are made readily accessible since all inboard connections are immobilized so that no relative movement requiring a seal exists.

In the accompanying drawings, which form part of the instant specification and which are to be read in conjunction therewith and in which like reference numerals are used to indicate like parts in the various views.

Figure 1 is a sectional view through the upper part of a power press showing the flywheel, the clutch and brake assembly and the improved sealing construction.

Figure 2 is a view drawn on an enlarged scale of the right-hand side of Figure 1 showing my improved sealing construction.

More particularly, referring now to the drawings, a pillar block 4 supports a roller bearing 6 in which is journaled one end of a shaft 8. A brake drum 10 is secured to the shaft for rotation therewith and is adapted to co-act with a brake band 12 provided with brake lining 14. A pillar block 16 supports an outer race 18 of a roller bearing. The inner race 20 supports sleeve 22. A plurality of rollers 24 are provided between inner race 20 and outer race 18. The sleeve 22 is in turn supported by a roller bearing comprising an outer race 26, an inner race 28 and rollers 30. The outer end of shaft 8 rotates upon the rollers 30. When the flywheel is unclutched, the shaft 8 is stationary. When the shaft 8 is clutched to the flywheel, it will rotate at the speed of the flywheel.

A flywheel 32 is provided with a plurality of V-belt grooves 34 through which it is driven through a prime mover (not shown).

A pair of inner races 36 are carried by the shaft 8. A pair of outer races 38 form roller bearings with rollers 40 positioned between the races 38 and 36. Rings 42 and 44 hold the upper races 38 and the lower races 36 in separated position. The flywheel is adapted to rotate on the pair of roller bearings just described. The flywheel carries a plurality of fan blades 46 adapted to cool the assembly. The shaft 8 is provided with a longitudinal bore 48 and a bore 50. Cross ducts 52 and 54 communicate with bores 48 and 50 respectively. Oil under pressure is adapted to be introduced through pipe 56 for passage through bore 48 to the flywheel bearings whence it may flow through duct 50 to lubricate the rollers 30 and thence through ducts 58, lubricating the rollers 24, finally draining through duct 60 and drainpipe 62. Oil seals 64 and 66 are provided to prevent an escape of the lubricant between the pillar block 16 and the sleeve 22. Oil seal 68 is provided to prevent the escape of the lubricant between the sleeve 22 and the shaft 8 as can readily be seen by reference to Figure 2. Oil seals 70 and 72 are provided to prevent the escape of the lubricant from the flywheel bearing as can readily be seen by reference to Figure 1.

A pinion 74 is keyed to the end of shaft 8 and meshes with a gear 76 in the driving gear train of the press.

A clutch housing 78 is secured to the flywheel for rotation therewith by means of a plurality of bolts 80. A clutch disc plate 82 is keyed to the shaft 8 for rotation therewith and carries a plurality of clutch discs 84. A stationary clutch plate 86 is formed in the housing 78. A movable clutch plate 88 is supported by the housing 78 by means of a plurality of members 90. A plurality of springs 92 normally urge the movable clutch plate 88 to the right as can readily be seen by reference to Figure 1. An annular piston 94 is lodged in an annular cylinder 96. An annular sealing ring 98 made of flexible material is positioned in the cylinder above the piston 94. A plurality of ducts 100 are formed in the housing 78 communicating with the annular cylinder 96. The arrangement is such that upon introduction of fluid pressure to the annular cylinder 96 the annular piston 94 will urge the movable clutch plate 88 to the left as viewed in Figure 1 against the action of springs 92 to clamp the clutch discs 84 between the movable clutch plate 88 and the stationary clutch plate 86, thus clutching the flywheel to the shaft 8. At the same time, a brake cylinder (not shown) will release the brake band 12 to free the shaft 8 as is well known in the art. The flywheel housing is provided with a plurality of buckets 102 adapted to act as a fan to throw out circulating air to cool the clutch structure.

A plurality of pipes 104 provides communication between each of the ducts 100 and corresponding ducts 106 formed in the sleeve 22. The ends of ducts 106 are provided with plugs 108 to seal the ends of the ducts 106. Each of the ducts 106 communicates with a radially extending duct 110 which provides communication between the ducts 106 and a chamber 112 formed in the member 114 which is secured to the sleeve 22 by a plurality of machine screws 116. The sleeve 22 is secured to the housing 78 by a plurality of machine screws 118. Since the sleeve 22 always rotates being attached to the housing 78 which is secured to the flywheel 32, and the member 114 rotates with the sleeve 22, there is no relative motion between the member 114 and the sleeve 22. A pair of sealing rings 120 and 122 are provided to prevent the escape of air introduced into the chamber 112.

A pair of members 124 and 126 are clamped to each other by a plurality of machine screws 128, the junction being provided with a gasket 130. The assembly formed by members 124 and 126 carries a pair of roller bearings 132 and 134. A fluid pressure delivery pipe 136 passes through the inner races of roller bearings 132 and 134 into the chamber 112. A fluid pressure sealing ring 138 is provided between the pipe 136 and the assembly formed by members 124 and 126. This assembly is secured to the rotating member 114 by means of tap bolts 140 as can readily be seen by reference to Figure 2.

It will be observed that fluid under pressure for the operation of the clutch is introduced through pipe 136 into the chamber 112 whence it communicates through radial ducts 110 to the axial ducts 106 and thence through pipes 104 through duct 100 to the annular cylinder 96. The entire seal between the rotating and stationary parts is achieved by means of the sealing ring 138. The pair of sealing rings 120 and 122, it will be observed further, provide sealing between relatively nonmovable parts and are hence not subject to wear.

It is believed that the operation of my assembly will be clear from the foregoing description. The flywheel is continuously driven by a prime mover, the flywheel rotating upon shaft 8 on roller bearings formed by the rollers 40 and the races 36 and 38. The flywheel in rotating carries with it the clutch housing 78 and the stationary clutch plate 86 and the movable clutch plate 88. The clutch disc plate 82, which is keyed to the shaft 8, is stationary when the clutch is disengaged. The springs 92 hold the movable clutch plate 88 out of engagement. The sleeve 22 being secured to the housing 78 rotates with it and the flywheel on rollers 24. The member 114 rotates along with the sleeve 22 and carries with it the assembly formed by the members 124 and 126. The pipe 136 is stationary. The friction of relative rotation between members 124 and 126 and the pipe 136 is minimized by the roller bearings 132 and 134. The sealing ring 138 seals communication between the interior of chamber 112 and the pipe 136, and this is the sole sealing means between stationary and moving parts. The sealing rings 120 and 122 seal only relatively stationary parts since the member 114 rotates with the sleeve 22. A backing ring 142 is adapted to clamp the sealing ring 138 between it and the flange 144, the pressure of clamping being adjustable by means of the machine screws 128. It will be observed, too, that the single sealing ring 138 is very readily accessible without expensive dismantling of press parts. The removal of the tap bolts 140 permits the ready removal of the assembly comprised by members 124 and 126. The unscrewing of machine screws 128 permits the replacement of the sealing ring 138. This is a minor repair task, involving a very small expenditure of time, and when it is necessary to replace the sealing ring 138, it can be done in a simple, convenient and expeditious manner.

It will be seen that I have accomplished the objects of my invention. I have provided an improved sealing construction for fluid pressure operated brake and clutch assemblies of power presses in which a flywheel is supported intermediate of bearings. I have provided an improved sealing construction for fluid pressure operated brake and clutch assemblies in power presses having a flywheel mounted intermediate bearings in which a single air seal is employed, which air seal, furthermore, is readily accessible for easy replacement.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention what I claim is:

1. A fluid pressure operated clutch assembly for power presses including in combination a press frame, a pair of bearings supported by the frame, a shaft journaled in the bearings, a flywheel carried by the shaft intermediate the bearings for relative rotation with respect thereto, a clutch, fluid pressure means for actuating the clutch operatively to connect the shaft to the flywheel for rotation therewith, said clutch including a housing, a sleeve secured to the housing for rotation therewith, one of said pair of bearings comprising a bearing carried by the press frame for rotatably mounting the sleeve and a bearing carried within the sleeve for rotatably receiving one end of the shaft, said sleeve being formed with a fluid passageway, means for providing communication between the passageway and the fluid pressure actuating means for the clutch, means carried by the sleeve forming a fluid pressure chamber, means providing communication between the fluid pressure chamber and the sleeve passageway, a stationary fluid pressure pipe extending into the chamber and means providing a seal between the fluid pressure pipe and the chamber, said means carried by the sleeve for forming the fluid pressure chamber being telescopically lodged within the sleeve and secured thereto for rotation therewith, said means providing communication between the fluid pressure chamber and the sleeve passageway comprising a radially extending duct and means for sealing the telescoped surfaces of the sleeve and the means carried by the sleeve on opposite sides of the radially extending duct.

2. A fluid pressure operated clutch assembly as in claim 1 in which said means for sealing the telescoped surfaces of said sleeve and said means carried by said sleeve on opposite sides of the radially extending duct comprising a pair of annular sealing rings.

GEORGE I. DANLY.

REFERENCES CITED

The following references are of record in the file of this patent:

UNITED STATES PATENTS

| Number | Name | Date |
|---|---|---|
| 574,269 | Richards | Dec. 29, 1896 |
| 1,249,736 | Frink | Dec. 11, 1917 |
| 1,425,635 | Dodd | Aug. 15, 1922 |
| 1,543,889 | Wickes | June 30, 1925 |
| 2,023,597 | Flocke et al. | Dec. 10, 1935 |

FOREIGN PATENTS

| Number | Country | Date |
|---|---|---|
| 186,166 | Great Britain | Sept. 25, 1922 |